(12) United States Patent
Yagi et al.

(10) Patent No.: US 12,145,852 B2
(45) Date of Patent: Nov. 19, 2024

(54) SILICA SPHERICAL PARTICLES FOR SEMICONDUCTOR SEALING MATERIAL

(71) Applicant: NIPPON STEEL Chemical & Material Co., Ltd., Tokyo (JP)

(72) Inventors: Katsumasa Yagi, Tokyo (JP); Dota Saito, Tokyo (JP); Mutsuhito Tanaka, Tokyo (JP); Masanori Ae, Tokyo (JP); Hiroyuki Deai, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 685 days.

(21) Appl. No.: 17/293,112

(22) PCT Filed: Nov. 13, 2019

(86) PCT No.: PCT/JP2019/044586
§ 371 (c)(1),
(2) Date: May 12, 2021

(87) PCT Pub. No.: WO2020/100952
PCT Pub. Date: May 22, 2020

(65) Prior Publication Data
US 2022/0009783 A1    Jan. 13, 2022

(30) Foreign Application Priority Data

Nov. 13, 2018 (JP) .................................. 2018-213267

(51) Int. Cl.
*C01B 33/12* (2006.01)
*C08K 3/36* (2006.01)
*C09K 3/10* (2006.01)

(52) U.S. Cl.
CPC ................ *C01B 33/12* (2013.01); *C08K 3/36* (2013.01); *C01P 2004/32* (2013.01);
(Continued)

(58) Field of Classification Search
CPC ........... C01B 33/12; C01B 33/18; C08K 3/36; C08K 2201/005; C01P 2004/32; C01P 2004/61; C01P 2006/12; C09K 3/1006
See application file for complete search history.

(56) References Cited

U.S. PATENT DOCUMENTS 6,303,223 B1 * 10/2001 Kinose .................. C04B 14/062
106/490
2003/0190276 A1    10/2003 Unehara et al.
2017/0179476 A1    6/2017 Watanabe

FOREIGN PATENT DOCUMENTS

JP          2000-3983 A     1/2000
JP          2000-178413 A   6/2000
(Continued)

OTHER PUBLICATIONS

Suzuki et al. Proceedings of the 8th Thermal Engineering Joint Conference. Mar. 13 to 17, 2011 Honolulu, Hawaii, USA (Year: 2011).*

(Continued)

*Primary Examiner* — Sally A Merkling
*Assistant Examiner* — Jordan W Taylor
(74) *Attorney, Agent, or Firm* — Birch, Stewart, Kolasch & Birch, LLP

(57) ABSTRACT

The purpose of the present invention is to provide: silica particles of which the maximum particle diameter can be minimized and which can achieve proper fluidability that cannot be achieved by the conventional techniques; and silica spherical particles which, when used as a filler for a heat-dissipating sheet, can achieve excellent heat conductivity and flexibility. Silica spherical particles characterized in that, when particles each having a size of 5 μm or more and imaged by an optical measurement are observed, the particle diameter of each of the particles, which is determined from the image, satisfies the following requirements.

(Continued)

Requirements: D99≤29 μm, and 10 μm≤Dmode<D99, and D99/Dmode≤1.5, and Dmode≤20 μm.

8 Claims, 2 Drawing Sheets

(52) U.S. Cl.
CPC ...... *C01P 2004/61* (2013.01); *C01P 2006/12* (2013.01); *C09K 3/1006* (2013.01)

(56) References Cited

FOREIGN PATENT DOCUMENTS

| | | | |
|---|---|---|---|
| JP | 2001-199713 | A | 7/2001 |
| JP | 2003-110065 | A | 4/2003 |
| JP | 2003-267722 | A | 9/2003 |
| JP | 4155729 | B2 * | 9/2008 |
| JP | 4244259 | B2 | 3/2009 |
| JP | 2015-13789 | A | 1/2015 |
| JP | 2015-86120 | A | 5/2015 |
| JP | 2015-113277 | A | 6/2015 |
| JP | 2015-149171 | A | 8/2015 |
| JP | 2018-65722 | A | 4/2018 |
| WO | WO 02/26626 | A1 | 4/2002 |

OTHER PUBLICATIONS

Ai et al. PowderTechnology 2011, 210, 323-327 (Year: 2011).*
Jin et al. Journal of Materials Processing Technology 2010, 210, 81-84 (Year: 2010).*
Nishi et al. JP4155729B2—Spherical inorganic powder and use thereof—English Translation (Year: 2008).*
Nakamura et al., "Encapsulation Materials for Mold Underfill with High Filling Ability," Panasonic Electric Works Technical Report, vol. 59, No. 1, 2011, pp. 50-54, with an English abstract.

* cited by examiner

SILICA SPHERICAL PARTICLES FOR SEMICONDUCTOR SEALING MATERIAL

TECHNICAL FIELD

The present invention relates to silica spherical particles used for a semiconductor sealing material.

BACKGROUND ART

In recent years, semiconductor packages have become increasingly smaller and thinner. Particularly, in applications typified by smartphones, flip-chip connections that can be made thinner by multi-pins with a larger number of pins have been widely used, instead of conventional wire bonding. Flip-chip connection connects electrodes on a silicon chip and a substrate via minute solder balls, and has an advantage of saving space as compared with the conventional wire bonding portion. On the other hand, as the number of pins increases, a distance between adjacent solder balls becomes narrower, and a gap between the silicon chip and the substrate becomes narrower year by year (see Non-Patent Document 1). In the past, when such a narrow gap is sealed, sealing was performed with a resin alone without being filled with a filler. In such a case, it is necessary to seal separately with a resin different from the resin for the overfill, which causes a problem that the productivity and the cost are greatly compromised. Further, in order to carry out underfill and overfill at the same time, spherical silica having high filling and appropriate fluidity is required for both of the overfill and underfill materials.

Also, with the miniaturization and higher performance of electronic device parts, heat generation management has been becoming more important. Heat generated by a heating element such as a semiconductor device is treated by a heat-dissipating component such as a heat sink, and a heat-dissipating sheet is sandwiched between the heating element and the heat-dissipating component to enhance the heat dissipation effect. In order to obtain a sufficient heat dissipation effect, the heat-dissipating sheet is required to be flexible enough to fill the gap generated by the surface roughness of the heating element and the heat dissipating component, since this gap will greatly impair the heat dissipation effect.

So far, various silica particles have been studied.

Patent Document 1 discloses an amorphous silica powder having a specified particle size and specific surface area as a metal oxide powder capable of producing a liquid sealing material having excellent filling property and storage stability.

Patent Document 2 aims to provide a liquid sealing resin composition having excellent gap permeability and high reliability for sealing a slight gap between a substrate and an IC chip, and a molten spherical silica filler to be filled therein. In addition to the particle size and specific surface area, the silica filler also has a specified sphericity.

Patent Document 3 aims to provide a spherical silica fine powder having a controlled particle diameter, which can be highly filled in a resin composition for sealing a semiconductor and does not impair the fluidity of the resin. The spherical silica fine powder is specified by the weight of coarse particle residue on the sieve, the gradient n of Rosin-Rammler diagram, and a total content of Fe and Al by ICP emission spectroscopy.

Patent Document 4 aims to provide a spherical inorganic powder and a resin composition capable of obtaining a semiconductor sealing material having excellent fluidity, filling property, and moldability even when a package form is ultra-thin. In addition to the particle size and specific surface area, the inorganic powder also has a specified (d99/mode).

PRIOR ART DOCUMENT

Patent Document

Patent Document 1: Japanese Patent No. 4244259
Patent Document 2: Japanese Unexamined Patent Publication (Kokai) No. 2000-003983
Patent Document 3: Japanese Unexamined Patent Publication (Kokai) No. 2015-086120
Patent Document 4: U.S. Pat. No. 4,155,729

Non-Patent Document

Non-Patent Document 1: Masashi Nakamura et al. (2011) "Sealing Material for Highly Fillable Mold Underfill", "Panasonic Electric Works" vol. 59 No. 1 p. 50-54

SUMMARY OF THE INVENTION

Problems to be Solved by the Invention

Needless to say, the particle diameter of spherical silica must be smaller than the underfill gap in order to realize underfill with a sealing material containing spherical silica. For example, when the gap under the flip chip is 40 µm, the maximum particle diameter of the spherical silica particles needs to be limited to 20 to 30 µm, but it is likely to cause problems such as that the sealing material with such a particle diameter has poor fluidity and forms voids in the package. Fluidity is an important quality factor for sealing materials, and many improvements have been proposed for conventional sealing materials for packaging having relatively large particle diameters (maximum particle diameter greater than about 30 µm).

For example, Patent Document 4 can be mentioned. As described in the paragraph [0013] of the same document, it is assumed that the particle diameter of the main filler is 20-50 µm. When the particle diameter was large as described above, it was easy to improve the fluidity, but such a particle diameter was not fundamentally applicable to the purpose of underfill application.

Patent Document 3 discloses an idea such as suppressing coarse particles on a 45 µm sieve. In the case of such a particle diameter, it can be applied to an underfill having a relatively wide gap. However, it becomes difficult to apply this idea to a package having a bump height of 55 µm or 50 µm as shown in Table 1 of Non-Patent Document 1. Patent Document 3 also mentions suppression of coarse particles on a 25 µm sieve, and the average particle diameter in Examples 1-4 and 6-7 is 6.22 µm or less. When such a filler having an average particle diameter of 7 µm or less is used, the fluidity in a state where the shear rate is high is excessively high, and the difference from the fluidity in a state where the shear rate is slow becomes large. When such a sealing material is used, there is a problem that the overfill having a high shear rate is completed while the underfill having a slow shear rate is not filled, and voids are formed in the underfill.

Patent Document 2 is a similar invention, but as seen in Table 1 of the same document, it is devised that the fluidity is improved by sufficiently lowering the average particle diameter from the gap distance and further suppressing the ratio of fine particles having a size of 1 μm or less. However, if the ratio of fine particles having a size of 1 μm or less were extremely suppressed, there was a problem that the filling rate was inevitably sacrificed and the improvement of fluidity was not sufficient.

Patent Document 1 also discloses silica particles that can be applied to underfill material and has the maximum particle diameter of 20 μm or less and the median size of 2.0-8.0 μm. Similar to Patent Document 3, since the average particle diameter is small, there is a problem that void formation is likely to occur due to the difference in filling speed between overfill and underfill.

According to Table 2 of Non-Patent Document 1, it is necessary to lower a cut point in order to improve a filling ratio. However, simply lowering the cut point suggests a problem of a filling property in a narrow gap, e.g., due to impairing fluidity as illustrated in the spiral flow. Further, in Table 3 of the same document, an average particle diameter of 11 μm and a cut point of 30 μm are illustrated, but the unfilled ratio becomes high when filled into a narrow gap.

In view of such a situation, it is an object of the present invention to provide silica spherical particles whose maximum particle diameter can be reduced and which can realize an appropriate fluidity which could not be achieved by the prior art.

On the other hand, the heat dissipation sheet is manufactured by kneading a resin and a filler in the same way as the sealing material and molding them into a sheet. Highly thermally conductive ceramic particles such as silica and alumina are used as the filler. It is necessary to increase the filler ratio in order to obtain a high thermal conductivity. However, in general, if the filler ratio is increased, the sheet hardness becomes high, and there is a risk of impairing the filling of gaps due to the surface roughness of heating elements and heat dissipating components. That is, it is necessary to have both excellent thermal conductivity and flexibility. The flexibility of the sheet is considered to correlate with the fluidity of the filler. The high fluidity of the filler means that the resin easily wraps around the filler, and the resin that wraps around the filler provides the flexibility of the sheet. There is no description or suggestion of this flexibility in the above documents. In view of such a situation, an object of the present invention is to provide silica spherical particles that realize a heat dissipating sheet having excellent thermal conductivity and flexibility when used as a filler of the heat dissipating sheet.

Means for Solving Problems

The present invention has been made by diligently studying the above-mentioned problems. The present invention provides the following aspects.

[1] Silica spherical particles having D99≤29 μm and 10 μm≤Dmode<D99 and D99/Dmode≤1.5 and Dmode≤20 μm, wherein the numerical values relating to the particle diameter of the particles are those obtained by measuring 2000 or more of particles having a particle diameter of 5 μm or more and a roundness of 0.7 or more by an optical microscope, and D99 and Dmode are obtained from the cumulative frequency based on the volume.

[2] The silica spherical particles according to item [1], wherein the average roundness of the particles with a particle diameter of 5 μm or more and less than 10 μm is 0.98 or more, and the average roundness of the particles with a particle diameter of 10 μm or more and less than 20 μm is 0.97 or more.

[3] The silica spherical particles according to item [1] or [2], wherein the slope n of Rosin-Rammler diagram at a particle diameter of 10 to 20 μm is 3.5 or more.

[4] The silica spherical particles according to any one of items [1] to [3], wherein the volume ratio of the particles with a particle diameter of 1 μm or less measured by a laser particle diameter meter is less than 2.7%.

[5] The silica spherical particles according to any one of items [1] to [4], wherein the BET specific surface area is less than 4.0.

The Effect of the Invention

The silica particles according to the present invention have a small maximum particle diameter and realize an appropriate fluidity that was not possible with the prior art. That is, it is extremely useful as a sealing material for semiconductors and the like that need to fill narrow gaps, exemplified in mold underfill.

Incidentally, two indicators of fluidity are used: a value obtained by a flow tester method, which uses a relatively high shear rate, and a value obtained by a rheometer method, which uses a slow shear rate. In the transfer mold, the flow velocity at the gate portion of the mold is relatively fast, and in the flow tester method, a smooth fluidity at the gate portion is suitably evaluated. From this point of view, in the flow tester method, a discharge rate is preferably 0.4 ml/sec or more, and more preferably 0.5 ml/sec or more.

On the other hand, a flow velocity of the sealing material in the semiconductor package portion is slower than that in the gate portion as a shear rate. In particular, the flow velocity of the underfill portion of the narrow gap becomes slow, and the flow velocity of the other overfill portion becomes relatively high. When such a velocity difference is remarkable, the easily flowing portion is preferentially sealed, and voids are likely to occur in the remained underfill portion. Therefore, it is necessary that the fluidity in the region where the shear rate is slow be kept within an appropriate range. From this point of view, the fluidity at such a slow shear rate is evaluated by the kinematic viscosity in the rheometer. The kinematic viscosity at 1 rad/sec was evaluated as a representative value. Here, the viscosity of 100 Pa·sec or more and less than 1500 Pa·sec is desirable, and further the viscosity of 400 Pa·sec or more and less than 1000 Pa·sec is desirable.

Further, in the heat dissipating sheet, the thermal conductivity is mainly influenced by the filler ratio as described above, and the sheet hardness is influenced by the fluidity of the filler. According to the present invention, it is possible to produce a heat dissipating sheet having excellent flexibility while increasing the filler ratio to obtain high thermal conductivity.

EMBODIMENTS FOR CARRYING OUT THE INVENTION

Hereinafter, the present invention and methods such as measurement method will be described in detail.

The silica spherical particles according to the present invention are silica spherical particles characterized in that, when particles with a particle diameter of 5 μm or more imaged by an optical measurement are observed, the particle diameter determined from the image satisfies the following requirements. Requirements: D99≤29 μm, 10 μm≤Dmode<D99, D99/Dmode≤1.5, and Dmode≤20 μm.

Since D99≤29 μm, filling is possible even with a narrow gap of about 40 μm. D99 is more preferably 27 μm or less, and even more preferably 25 μm or less, in order to be capable of flexibly coping with narrow gaps. In addition, in order to ensure appropriate fluidity, it is necessary to set D99/Dmode to 1.5 or less. It is more desirable if it is 1.4 or less. The silica spherical particles according to the present invention have Dmode of 10 μm or more and 20 μm or less. Dmode is one of the indicators that influences the properties of silica spherical particles. If Dmode is less than 10 μm, the fluidity may decrease, and if Dmode is more than 20 μm, it becomes difficult to cope with a narrow gap. A more preferred lower limit for Dmode is 15 μm. Dmode<D99 is a specific item for eliminating a special particle size distribution. (For example, there is a mode of particle diameter in the range of 1% from the larger particle on a volume basis, and 99% of the smaller particles do not have the mode.) D99/Dmode is defined for the distribution position of Dmode in the approximate overall particle size distribution, and if it exceeds 1.5, the fluidity may decrease. Although the individual definitions regarding the particle size have been described, the silica particles according to the present invention can have a small maximum particle diameter and realize an appropriate fluidity that was not possible with the conventional arts, by satisfying all of D99≤29 μm and 10 μm≤Dmode<D99 and D99/Dmode≤1.5 and Dmode≤20 μm.

Figure 1:
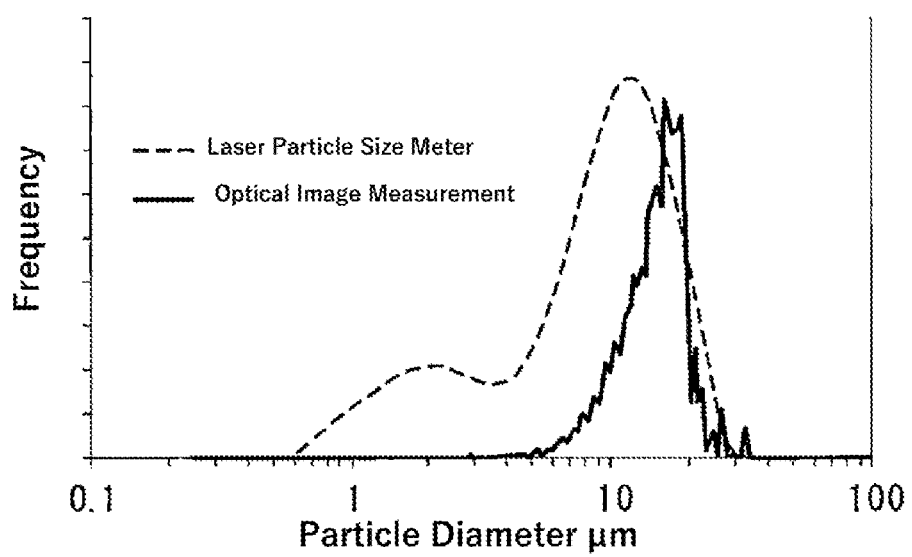
FIG. 1 is a diagram showing the particle diameter measurement results by two types of measurement methods.

The above particle diameter is measured by analyzing an optically captured particle image. Generally, a measuring device based on laser scattering/diffraction is often used for particle size distribution measurement. However, since the actual size of individual particles is not measured, it is not appropriate for defining the requirements regarding the particle size of the silica particles according to the present invention. FIG. 1 compares the particle size distributions of particles obtained by cutting coarse particles with a sieve having a mesh size of 20 μm and measured by a laser particle size meter (MS3000 manufactured by Malvern) and an optical image observation (FP3000 manufactured by Malvern Panalytical). In the optical image observation, the coarse particles cut by the sieve can be measured precisely, whereas in the laser particle size meter, the particle size data is a logarithmic normal distribution data, wherein the particle size peak position is far away from the cut diameter. As described above, it is understood that observation of individual particles is indispensable for accurate measurement of particle diameter distribution.

If the particle diameter distribution is 5 μm or more, it is possible to observe the real image of individual particles optically imaged, and the actual particle size distribution can be measured more accurately. In the present invention, 2000 or more of particles having a particle diameter of 5 μm or more and a roundness of 0.7 or more are measured, and the particle diameter distribution is calculated on a volume basis. A roundness of less than 0.7 is a prescription that excludes non-essential effects such as foreign substances other than silica particles. D10, D50, D99, and Dmode of the present invention are defined by the measurement of this optical image. The details of the definitions will be described later.

Further, in one embodiment of the present invention, the silica spherical particles satisfy the prescription in item [1] as described above, and the particles with a particle diameter of 5 μm or more and less than 10 μm may have an average roundness of 0.98 or more and the particles with a particle diameter of 10 μm or more and less than 20 μm may have an average roundness of 0.97 or more.

In general, deterioration of roundness impairs the fluidity of the sealing material. Normally, as the particle diameter increases, the particle shape tends to be distorted, and the roundness tends to deteriorate. The present inventors have found that the particles become remarkably suitable for underfill molding by improving not only the roundness of the particles with a particle diameter of 5 μm or more and less than 10 μm but also the roundness of the particles with a particle diameter of 10 μm or more and less than 20 μm. The upper limit of the roundness is not particularly limited, and the roundness may be 1.0 or less, and a practically preferable upper limit may be 0.995 or less.

Further, in one embodiment of the present invention, the silica spherical particles satisfy the prescription in item [1] or [2] as described above, and the slope n of Rosin-Rammler diagram of the particles with a particle diameter of 10 to 20 μm measured by the optical microscope in item [1] as described above, may be 3.5 or more.

The present inventors have found that the particle size distribution particularly in the range of particle diameter of 10 to 20 μm has an important effect on the silica spherical particles for underfilling. In order to fill narrow gaps and maintain proper fluidity, it is essential that the resin penetrates between the silica spherical particles during sealing. In order to realize this, it is preferable that the distribution in the same particle diameter range is sharp, and it is desirable that the slope n of the Rosin-Rrammler diagram is 3.5 or more. More desirably, n is 3.7 or more, and even more desirably n is 3.9 or more. The upper limit of n is not particularly limited, and may be 10 or less, and a practically preferable upper limit may be 7 or less.

Further, in one embodiment of the present invention, the silica spherical particles satisfy the prescription in any one of items [1] to [3] as described above, and the volume ratio of the particles with a particle diameter of 1 μm or less measured by the laser particle size meter may be less than 2.7%.

The fine powder content ratio of the particles with a particle diameter of 1 μm or less greatly affects the filling property and fluidity. The inventors have found that in underfill applications, proper fluidity can be imparted by controlling the ratio of the particles with a particle diameter of 1 μm to be less than 2.7%. The lower limit of the volume ratio of the particles with a particle diameter of 1 μm or less is not particularly limited, and may be 0, and a practically preferable lower limit may be 0.1% or more.

Further, in one embodiment of the present invention, the silica spherical particles satisfy the prescription in any one of items [1] to [4] as described above, and may have BET specific surface area of 4.0 m$^2$/g or less.

If the specific surface area becomes excessive, the fluidity may be significantly impaired. This is due to the consumption of the resin on the surface of the particles and the increase in friction between the particles. The present inventors have found that the specific surface area of BET method must be 4.0 m$^2$/g or less. Also preferably, it is less than 3.4 m$^2$/g. The lower limit of the BET specific surface area is not particularly limited, but a practically preferable lower limit may be 0.1 m$^2$/g or more, and more preferably 1 m$^2$/g or more.

The silica spherical particles may be produced by a general method such as a method generally called a thermal spraying method. That is, it is a method of melting a non-spherical raw material such as crushed silica or metallic silicon by a flame obtained by reacting a fuel gas such as propane, methane or butane with oxygen, and spheroidizing it to a desired particle diameter. The obtained spherical silica can be separated into coarse particles and fine particles by a cyclone or the like, if necessary. The spherical silica thus obtained can be adjusted to a desired maximum particle diameter by a sieve having a desired opening or by using a wind power classifier or the like. Further, it is possible to obtain a desired specific surface area by mixing the above-mentioned fine particles or the like as needed.

Figure 2:
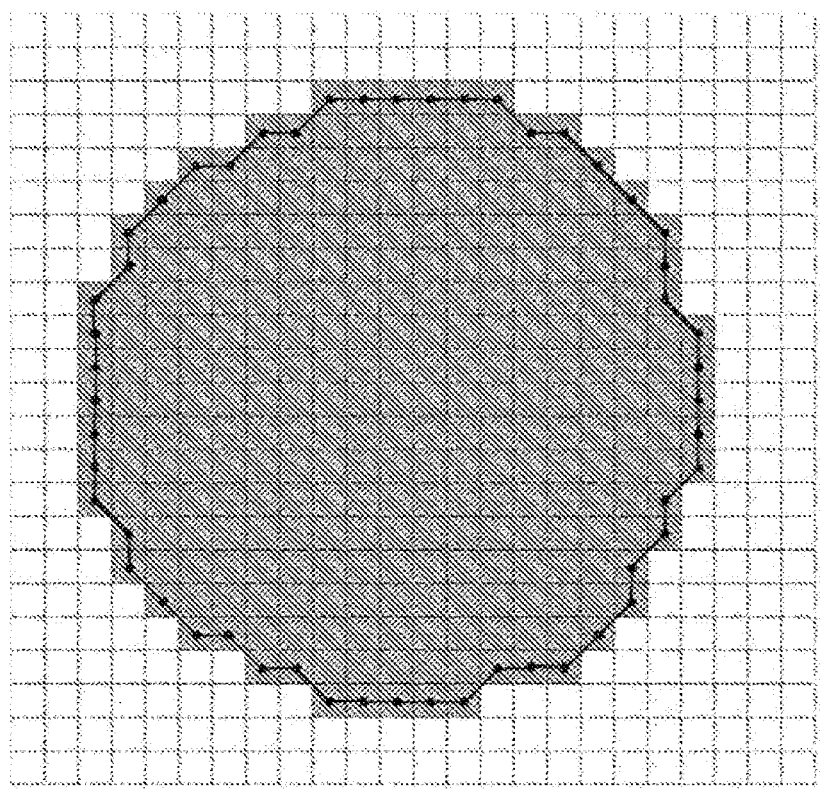
FIG. 2 is a diagram for explaining the calculation of the photographing area and the peripheral length of the particles.

As described above, the particle diameter of the silica particles according to the present invention is measured by optical measurement. That is, at least 2000 or more, desirably 5000 or more of particles with a particle diameter of 5 µm or more and a roundness of 0.7 or more are observed and measured by optical measurement. More specifically, first, 10 g of silica particles to be measured and 200 ml of distilled water are placed in a beaker, and the particles are sufficiently dispersed by using an ultrasonic homogenizer with ultrasonic waves set to 150 to 500 W at a frequency of 20 to 30 kHz to perform dispersion treatment for 30 seconds or more. Allow the dispersed beaker to stand still for 1 minute, discard 180 ml on the supernatant side, and add fresh distilled water to make up to 200 ml. From this, the required amount of sample is taken out with a pipette or the like and measured with an optical measuring device. Note that such procedures such as discarding the supernatant side are intended only for optical measurements of the particles with a particle diameter of 5 µm or more, and are not applied to measurements such as laser particle size measurement, BET specific surface area measurement, rheometer and flow tester. An automatic measuring device may be used for imaging and analysis, and FP3000 from Malvern Panalytical was used in the following working examples and comparative examples. An automatic analysis device such as this device has functions such as smoothing of the obtained particle size distribution, but such functions are not used in the working examples and comparative examples, and the raw data of the measured particles are used. The particle diameter is defined as the equivalent diameter of a circle. This is a circular diameter with an area equal to the projected area on the measured image and is calculated by 2×(particle projected area/π)^0.5. The projected area is determined by image processing, but as shown in FIG. 2, the particle is image-processed such as by binary imaging, and the center of each pixel cell in the outline of the particle is connected by a straight line to define the enclosed area. The objective lens of the measuring device is selected depending on the number of pixels, to achieve about 0.5-1 µm/pixel.

The particle size distribution is analyzed from the obtained data. Since powder generally has a particle size distribution shape close to the logarithmic normal distribution, 5-100 µm is divided into 113 sections with an equal ratio division in the present invention. Therefore, the adjacent sections are set at the ratio of $(100/5)^{(1/113)}=1.026865$ times. The geometric mean of the upper and lower limits of the section is used as the section representative value. For example, since the first section is 5 µm or more and less than 5.134327 µm, the section representative value is $(5\times5.134327)^{0.5}=5.066718$ µm. The histogram is based on the spherical equivalent volume. That is, the global equivalent volumes of the particles corresponding to each particle size section are totaled. The cumulative frequency shall be the volume accumulated from the fine grain side. The representative values of the first section where the cumulative volume exceeds 10, 50 and 99% of the total volume are defined as D10, D50 and D99, respectively. Dmode is defined as the so-called mode, that is, the section representative value of the particle size section in which the histogram shows the maximum value.

In this optical measurement, it is possible to measure roundness at the same time. The roundness is measured for each particle, and is defined as a value obtained by multiplying the equivalent circle diameter by the circular ratio and dividing this by the peripheral length of the particle. As for the measurement of the peripheral length, as shown in FIG. 2, the particles are subjected to image processing such as binary imaging, and the center of each pixel cell in the outline of the particles is connected by a straight line, and the length of the connected straight line is defined as peripheral length.

Also, the slope n of the so-called Rosin-Rammler diagram can be calculated from the cumulative frequency. A model that describes the powder particle size distribution called Rosin-Rammler distribution is widely known, and the cumulative frequency Q (x) obtained by volume integration from the minimum particle diameter is as follows.

$$Q(x)=1-\exp(-b^*x^n) \quad \text{Formula (1)}$$

wherein b is a fitting parameter, x is a particle diameter, and n is an index indicating the sharpness of the distribution. Formula (1) can be transformed into one as described in Formula (2).

$$\ln(b)+n^*\ln(x)=\ln(-\ln(1-Q(x))) \quad \text{Formula (2)}$$

wherein $X=\ln(x)$ and $Y=\ln(-\ln(1-Q(x)))$. The slope n can be obtained by linearly approximating the relationship between Y and X. In the present invention, the slope n is determined in the particle diameter range of 10-20 µm.

According to the above optical measurement, it is possible to measure particles with a particle diameter of 5 µm or more, but it is difficult to accurately measure particles with a particle diameter of less than 5 µm. In particular, for particle diameters smaller than 1 µm, it is almost impossible to measure the diameter due to the resolution limit of the optical system. Therefore, the volume ratio of particles with a particle diameter of 1 µm or less is measured using a laser particle size meter. In the working examples and comparative examples, MS3000 manufactured by Malvern was used. In the particle size measurement by optical measurement, the particles were dispersed with distilled water and the supernatant was discarded. However, this treatment is not performed for laser particle size distribution measurement, and the particles including fine particles with a particle diameter of 1 µm or less used for the sealing material in the original state are used for measurement. The measurement conditions are non-spherical particle mode, particle refractive index of 1.544, absorption rate of 0.100, and particle density of 2.20 g/cm³. The dispersion medium is water, the refractive index is 1.330, and the level sensor threshold is 100.00. Histogram analysis of particle diameter is performed by dividing 0.01-3500 µm into 100 sections with an equal ratio division. Therefore, the adjacent sections are set at $(3500/0.01)^{(1/100)}=1.136163$ times. The representative value is the geometric mean at both ends of each section. The cumulative volume frequency is obtained from the fine particle side of the histogram obtained in this way, and the volume ratio of the particles with a particle diameter of 1 µm or less is obtained.

In addition, the flow tester method, that is, the method of measuring the fluidity with a flow meter will be described below. First, the silica spherical particles are mixed with a resin so that the filler ratio is 80%. In the working examples and comparative examples, Epoxy Resin 801N manufactured by Mitsubishi Chemical was used as the resin. The mixture is mixed for 1 minute or more using a kneader so that the filler is sufficiently dispersed in the resin, and after kneading, the container is cooled for 60 minutes. In the working examples and comparative examples, measurements were made with a flow tester CFT-500D manufactured by Shimadzu. About 10 ml of the kneaded sample was set to a temperature of 28.5° C. and extruded from a die having a diameter of 2.0 mm and a length of 75.0 mm. The extrusion load is 50.0 kgf, and the discharge rate (ml/sec) from the time when about 50% of the sample is extruded to the time of completion of 75% extrusion is measured.

The method for measuring kinematic viscosity by the rheometer method will be described below. Similar to the above flow meter, the silica spherical particles are mixed with the resin so that the filler ratio is 80%. In the working examples and comparative examples, Epoxy Resin 801N manufactured by Mitsubishi Chemical was used as the resin. The mixture is mixed for 15 seconds under the atmospheric pressure using a kneader so that the filler is sufficiently dispersed in the resin, subsequently vacuum kneaded for 90 seconds, and the container after kneading was cooled for 60 minutes. In the working examples and comparative examples, measurements were performed by MCR102 manufactured by Anton Paar. The measurements are made under the following conditions: the parallel plate to be rotationally vibrated shall have a diameter of 50 mm, the vibration frequency shall be 1 rad/sec, and the maximum shear strain at the outermost circumference shall be 0.1%. The absolute value of complex kinematic viscosity is described as the measured value.

Also, the BET specific surface area is measured in accordance with JIS R 1626.

Further, in order to verify the effect of improving a thermal conductivity of the silica spherical particles of the present invention, the resin and the product of the present invention can be kneaded to prepare a heat conductive sheet, and the thermal conductivity of the sheet can be measured. First, the silica spherical particles are mixed with a silicone resin (CY52-276A/B manufactured by Dow Corning) at a filler ratio of 80% by weight, vacuum degassed to 5 Torr or less, and kneaded. Subsequently, the resulting mixture is molded with a mold. The mold was heated to 120° C., and the mixture was compacted at 6-7 MPa and molded for 40 minutes. The resin composition is removed from the mold and cured at 140° C. for 1 hour. After cooling to room temperature, the resin composition is sliced into sheets having a thicknesses of 1.5, 2.5, 4.5, 6.5, 7.5 and 8.5 mm, respectively, and processed into a 2 cm square sheet-shaped sample. The thermal resistance of each sample was measured in accordance with ASTM D5470. The sample is sandwiched between SUS304 blocks, compressed at 0.123 MPa, and the thickness after compression is recorded. The relationship between the thermal resistance value of the sample thus obtained and the thickness after compression is linearly approximated, and the thermal conductivity of the resin composition sample and the interfacial resistance generated at the interface between the block and the sample are measured. Further, the hardness of the resin composition was measured using an Asker rubber hardness tester E type. The silicone resin composition using silica spherical particles as a filler according to the present invention has excellent flexibility while obtaining high thermal conductivity.

EXAMPLES (Preparation of Silica Spherical Particles)

Crushed silica raw material was used to be spheroidized by thermal spraying method. The resulting particles were separated into coarse particles and fine particles by a cyclone, and as a result of the particle size measurement by the optical measurement on the coarse particle side, particles having D10 of 13.4 μm and D50 of 21.1 μm were prepared, and then sieved with an opening of 20 μm and collected only under the sieve. Silica fine powder having a specific surface area of 5 to 30 $m^2/g$ was added thereto and the resulting mixture was mixed so that the volume ratio of the particles with a particle diameter of 1 μm or less as measured by the laser particle size measurement was 1.2% to prepare silica spherical particles.

(Measurement of Silica Spherical Particles)

Dmode, D10, D50, D99, roundness, and slope n value (particle diameter 10-20 μm) of Rosin-Rammler diagram were obtained from the mixed silica particles by the above optical measurement. In addition, the volume ratio of particles with a particle diameter of 1 μm or less was determined by the above laser particle size measurement. Subsequently, the silica particles were measured with respect to the specific surface area by BET method, the kinematic viscosity by rheometer, and the discharge rate by flow tester.

The measurement results are summarized in Table 1. A1 to A6 are working examples, and A7 to A10 are comparative examples. D99/Dmode exceeds 1.5 for A7, A9 and A10, but in such a case, the fluidity measured by the flow tester is greatly reduced. It was confirmed that A8 has a Dmode of 23.0 μm and cannot cope with narrow gaps.

In addition, A3 of the particles with a particle diameter of 10 μm or more has a slightly low roundness of 0.932, but A1 and A2 of the particles with a particle diameter of 10 μm or more have a roundness of 0.97 or more. It was confirmed that the higher the roundness, the better the fluidity by the flow tester. Example A5 is a case where the slope n of Rosin-Rammler diagram is 3.3, which is a little low value. Namely, the distribution spreads from the mode diameter to the fine particle side. However, in A1 and A2, n is 3.5 or more, and it was confirmed that fluidity by the flow tester was improved. In A4, the sample has a high fine powder ratio (volume ratio with a particle diameter of 1 μm or less) of 4.6% and a large specific surface area. However, in A1 and A2, it was confirmed that the sample has a fine powder ratio of less than 2.7% and a kinematic viscosity by rheometer at 1 rad/sec was remarkably reduced.

TABLE 1

| Measurement Device Sample Number | Measurement Item | Unit | Example A1 | Example A2 | Example A3 | Example A4 | Example A5 | Example A6 | Comp. A7 | Comp. A8 | Comp. A9 | Comp. A10 |
|---|---|---|---|---|---|---|---|---|---|---|---|---|
| Optical Microscope Measurement | Dmode | um | 18.1 | 18.6 | 17.9 | 11.0 | 15.9 | 14.2 | 16.6 | 23.0 | 17.6 | 16.7 |
| | D10 | um | 9.3 | 9.9 | 9.2 | 7.1 | 7.7 | 6.1 | 8.3 | 12.7 | 6.7 | 8.4 |
| | D50 | um | 15.5 | 16.9 | 15.1 | 9.9 | 14.1 | 9.8 | 13.8 | 21.0 | 11.9 | 13.9 |
| | D99 | um | 24.9 | 26.1 | 24.4 | 16.1 | 23.5 | 21.1 | 25.5 | 30.0 | 29.8 | 25.4 |

TABLE 1-continued

| Measurement Device Sample Number | Measurement Item | Unit | Example A1 | Example A2 | Example A3 | Example A4 | Example A5 | Example A6 | Comp. A7 | Comp. A8 | Comp. A9 | Comp. A10 |
|---|---|---|---|---|---|---|---|---|---|---|---|---|
| | D99/Dmode | | 1.38 | 1.41 | 1.36 | 1.46 | 1.48 | 1.49 | 1.54 | 1.31 | 1.69 | 1.52 |
| | Roundness(5 um ≤ size < 10 um) | | 0.993 | 0.991 | 0.981 | 0.990 | 0.983 | 0.990 | 0.984 | 0.991 | 0.984 | 0.989 |
| | Roundness(10 um ≤ size < 20 um) | | 0.980 | 0.970 | 0.932 | 0.975 | 0.972 | 0.972 | 0.981 | 0.979 | 0.945 | 0.964 |
| | n value of Rosin-Rammler diagram (size range 10-20 um) | | 3.9 | 3.7 | 3.8 | 3.9 | 3.3 | 2.9 | 3.6 | 3.7 | 2.4 | 3.2 |
| Laser Particle Size Measurement | Volume ratio of 1 um or less | % | 1.2 | 1.1 | 1.1 | 4.6 | 2.5 | 1.7 | 2.6 | 1.0 | 3.9 | 2.7 |
| BET Method | Specific Surface Area | m2/g | 3.3 | 3.2 | 3.4 | 4.2 | 3.6 | 3.8 | 3.2 | 3.1 | 4.9 | 3.1 |
| Rheometer | Kinetic Viscosity(1 rad/sec) | Pa · sec | 457 | 709 | 752 | 1437 | 296 | 275 | 398 | 430 | 62 | 380 |
| Flow Tester | Discharge Rate | ml/sec | 0.51 | 0.55 | 0.42 | 0.45 | 0.42 | 0.40 | 0.31 | 0.61 | 0.34 | 0.36 |

(Heat Conductive Sheet)

Further, using the silica particles of A1 and A10 in Table 1, a heat conductive sheet was prepared according to the above procedure, and its heat conductivity and sheet hardness were measured. The results are shown in Table 2. Since the filler ratio was 80% in both cases, the thermal conductivity in which the filler ratio is a controlling factor was almost the same. However, it was found that A1 was more flexible than A10 in terms of sheet hardness. With respect to the interfacial thermal resistance between the upper and lower blocks and the sample obtained from the measurement of thermal conductivity, A1 is lower than A10. This is considered to be due to the difference in adhesion of the sheet to the block caused by the difference in sheet hardness. That is, it was confirmed that the silicone resin composition using the silica particles according to the present invention as a filler is excellent in flexibility while obtaining a high thermal conductivity.

TABLE 2

| | | Example A1 | Comp. A10 |
|---|---|---|---|
| Filler Ratio | % by weight | 80 | 80 |
| Thermal Conductivity | W/m · K | 0.90 | 0.90 |
| Interface Thermal Resistance | ×10$^{-4}$ m$^2$ · K/W | 2.45 | 2.95 |
| Sheet Hardness | — | 42 | 50 |

The invention claimed is:

1. Silica spherical particles characterized in that, when particles having a size of 5 μm or more and imaged by an optical measurement are observed, the particle diameter of the particles, which is determined from the image, satisfies the following requirements:
   D99≤29 μm,
   10 μm≤Dmode<D99,
   D99/Dmode≤1.5; and
   Dmode≤20 μm, wherein a BET specific surface area of the silicia spherical particles is less than 4.0 m$^2$/g.

2. The silica spherical particles according to claim 1, wherein the silica spherical particles with a particle diameter of 5 μm or more and less than 10 μm have an average roundness of 0.98 or more, and the silica spherical particles with a particle diameter of 10 μm or more and less than 20 μm have an average roundness of 0.97 or more.

3. The silica spherical particles according to claim 1, wherein a slope n of Rosin-Rammler diagram at 10 to 20 μm is 3.5 or more.

4. The silica spherical particles according to claim 1, wherein a volume ratio of the particles with a particle diameter of 1 μm or less measured by a laser particle size meter is less than 2.7%.

5. A resin mixture comprising the silica spherical particles according to claim 1 as a filler, and a resin.

6. A sealing material comprising the resin mixture according to claim 5.

7. A heat dissipating sheet comprising the resin mixture according to claim 5.

8. The silica spherical particles according to claim 1, wherein 2000 or more of particles having a particle diameter of 5 μm or more and a roundness of 0.7 or more are measured by the optical measurement.

* * * * *